(12) United States Patent
Nishikawa et al.

(10) Patent No.: US 12,487,409 B2
(45) Date of Patent: Dec. 2, 2025

(54) GRATING COUPLER

(71) Applicant: Mitsubishi Electric Corporation, Tokyo (JP)

(72) Inventors: Satoshi Nishikawa, Tokyo (JP); Masahiro Matsuura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 257 days.

(21) Appl. No.: 18/039,495

(22) PCT Filed: Dec. 14, 2020

(86) PCT No.: PCT/JP2020/046493
§ 371 (c)(1),
(2) Date: May 31, 2023

(87) PCT Pub. No.: WO2022/130442
PCT Pub. Date: Jun. 23, 2022

(65) Prior Publication Data
US 2024/0004142 A1 Jan. 4, 2024

(51) Int. Cl.
*G02B 6/34* (2006.01)
*G02B 6/124* (2006.01)

(52) U.S. Cl.
CPC ............... *G02B 6/34* (2013.01); *G02B 6/124* (2013.01)

(58) Field of Classification Search
CPC .................................. G02B 6/124; G02B 6/34
See application file for complete search history.

(56) References Cited

U.S. PATENT DOCUMENTS

| 4,097,118 A * | 6/1978 | Hammer | G02B 6/02066 |
| | | | 359/900 |
| 10,324,260 B1 * | 6/2019 | Evans | C09J 9/00 |
| 11,079,550 B2 | 8/2021 | Kojima et al. | |
| 11,143,821 B1 | 10/2021 | Kojima et al. | |
| 2014/0153605 A1 | 6/2014 | Arimoto et al. | |

(Continued)

FOREIGN PATENT DOCUMENTS

| CN | 101995609 A | 3/2011 |
| JP | 2004-507782 A | 3/2004 |

(Continued)

OTHER PUBLICATIONS

International Search Report and Written Opinion mailed on Mar. 2, 2021, received for PCT Application PCT/JP2020/046493, filed on Dec. 14, 2020, 12 pages including English Translation.

(Continued)

*Primary Examiner* — Michael P Mooney
(74) *Attorney, Agent, or Firm* — XSENSUS LLP

(57) ABSTRACT

A grating coupler includes: a first optical waveguide chip; a second optical waveguide chip; and a transparent member. The first optical waveguide chip includes a first substrate, a first waveguide grating, and a first chip end surface. The second optical waveguide chip includes a second waveguide grating and a second chip top surface. Between a first light incident/exit surface of the first optical waveguide chip and a second light incident/exit surface of the second optical waveguide chip, an optical path of light within an operating wavelength range of the grating coupler is filled with the transparent member.

20 Claims, 7 Drawing Sheets

(56) References Cited

U.S. PATENT DOCUMENTS

| | | | |
|---|---|---|---|
| 2015/0285996 A1* | 10/2015 | Selvaraja | G02B 6/124 438/31 |
| 2017/0179680 A1 | 6/2017 | Mahgerefteh et al. | |
| 2020/0081204 A1* | 3/2020 | Mahgerefteh | G02B 6/12002 |
| 2020/0174194 A1* | 6/2020 | Kojima | G02B 6/124 |
| 2020/0241204 A1 | 7/2020 | Kojima et al. | |
| 2020/0241205 A1 | 7/2020 | Kojima et al. | |

FOREIGN PATENT DOCUMENTS

| | | |
|---|---|---|
| JP | 2014-110257 A | 6/2014 |
| JP | 2015-121787 A | 7/2015 |
| JP | 2019-500753 A | 1/2019 |
| WO | 02/16979 A2 | 2/2002 |
| WO | 2017/106880 A1 | 6/2017 |
| WO | 2020/110789 A1 | 6/2020 |

OTHER PUBLICATIONS

Tang et al., "InP Grating Coupler Design for Vertical Coupling of InP and Silicon Chips", Proceedings of SPIE, vol. 11283, 112830H, Feb. 25, 2020, pp. 112830H-1-112830H-6.

Tang et al., "Design and Optimization of Shallow-Angle Grating Coupler for Vertical Emission from Indium Phosphide Devices", Mitsubishi Electric Research Laboratories Publication, TR2020-024, Mar. 11, 2020, 7 pages.

Notice of Reasons for Refusal mailed on Sep. 21, 2021, received for JP Application 2021-531255, 12 pages including English Translation.

U.S. Appl. No. 17/183,013, filed Feb. 23, 2021.

\* cited by examiner

GRATING COUPLER

CROSS-REFERENCE TO RELATED APPLICATION

The present application is based on PCT filing PCT/JP2020/046493, filed Dec. 14, 2020, the entire contents of which are incorporated herein by reference.

TECHNICAL FIELD

The present disclosure relates to a grating coupler.

BACKGROUND ART

Japanese National Patent Publication No. 2019-500753 (PTL 1) discloses a surface coupling system including an edge-emitting laser and an optical integrated circuit. The edge-emitting laser includes an active portion and a first surface grating. The optical integrated circuit includes a second surface grating. Light emitted from the active portion is diffracted by the first surface grating and coupled to the second surface grating.

CITATION LIST

Patent Literature

PTL 1: Japanese National Patent Publication No. 2019-500753

SUMMARY OF INVENTION

Technical Problem

However, in the surface coupling system disclosed in PTL 1, when even a slight alignment error occurs between the edge-emitting laser and the optical integrated circuit, the optical coupling efficiency between the first surface grating and the second surface grating decreases sharply. The present disclosure has been made in light of the above-described problem and an object thereof is to provide a grating coupler having a wider acceptable alignment error.

Solution to Problem

A grating coupler according to the present disclosure includes: a first optical waveguide chip; a second optical waveguide chip; and a transparent member. The first optical waveguide chip includes a first substrate including a first substrate top surface, a first optical waveguide, a first waveguide grating, a first chip bottom surface, a first chip top surface opposite to the first chip bottom surface, and a first chip end surface connected to the first chip top surface and the first chip bottom surface. The first optical waveguide is formed on the first substrate top surface. The first waveguide grating is formed on the first substrate top surface. The first waveguide grating is connected to the first optical waveguide and is more proximal to the first chip end surface than the first optical waveguide. The second optical waveguide chip includes a second substrate including a second substrate top surface, a second optical waveguide, a second waveguide grating, and a second chip top surface. The second optical waveguide is formed on the second substrate top surface. The second waveguide grating is formed on the second substrate top surface. The second waveguide grating is connected to the second optical waveguide and is more proximal to the first chip end surface than the second optical waveguide. The second waveguide grating is arranged on the first substrate side relative to the first waveguide grating in a direction in which the first chip top surface and the first chip bottom surface are spaced apart from each other. Light incident on the grating coupler according to the present disclosure passes through a first light incident/exit surface of the first optical waveguide chip and a second light incident/exit surface of the second optical waveguide chip, and is coupled between the first waveguide grating and the second waveguide grating, the first light incident/exit surface extending along the first chip end surface, the second light incident/exit surface extending along the second chip top surface. Between the first light incident/exit surface and the second light incident/exit surface, an optical path of the light within an operating wavelength range of the grating coupler is filled with the transparent member.

Advantageous Effects of Invention

The transparent member reduces a variation in incident position of the light on the first waveguide grating or the second waveguide grating, with respect to a change in relative position between the first optical waveguide chip and the second optical waveguide chip. A change in optical coupling efficiency of the first waveguide grating with respect to the light or a change in optical coupling efficiency of the second waveguide grating with respect to the light can be reduced. Therefore, the grating coupler according to the present disclosure has a wider acceptable alignment error.

DESCRIPTION OF EMBODIMENTS

Figure 1:
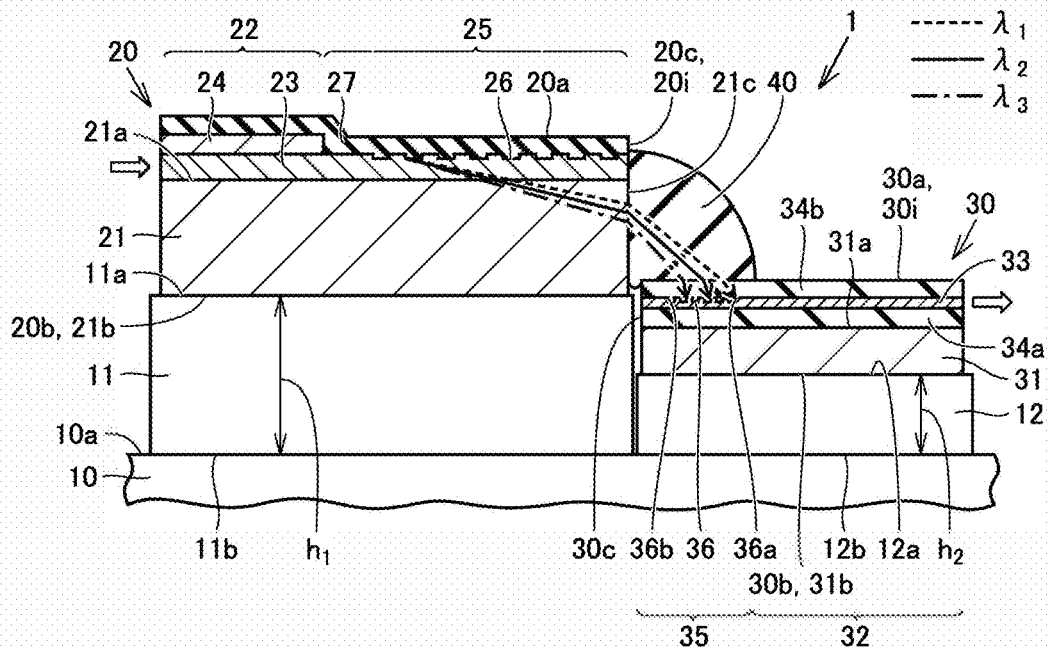
FIG. 1 is a schematic cross-sectional view of a grating coupler according to a first embodiment.

Embodiments of the present disclosure will be described hereinafter. The same components are denoted by the same reference numerals and description thereof will not be repeated.

First Embodiment

A grating coupler 1 according to a first embodiment will be described with reference to FIGS. 1 to 10. Grating coupler 1 mainly includes a first optical waveguide chip 20, a second optical waveguide chip 30 and a transparent member 40. Grating coupler 1 may further include a first submount 11 and a second submount 12.

Grating coupler 1 is placed on a mount 10. Mount 10 is made of, for example, a metal material having a high thermal conductivity, such as a copper tungsten alloy. Specifically, mount 10 has a main surface 10a. First submount 11 and second submount 12 are placed on main surface 10a of mount 10. First submount 11 and second submount 12 are fixed to main surface 10a of mount 10 by using an adhesive such as an electrically conductive adhesive (not shown). Each of first submount 11 and second submount 12 is made of, for example, an electrically insulating material having a high thermal conductivity, such as alumina or aluminum nitride.

A height $h_2$ of second submount 12 is lower than a height $h_1$ of first submount 11. Height $h_1$ of first submount 11 is defined as a distance between a bottom surface 11b of first submount 11 that faces main surface 10a of mount 10 and a top surface 11a of first submount 11 opposite to bottom surface 11b. Height $h_2$ of second submount 12 is defined as a distance between a bottom surface 12b of second submount 12 that faces main surface 10a of mount 10 and a top surface 12a of second submount 12 opposite to bottom surface 12b. First optical waveguide chip 20 is placed on first submount 11. First optical waveguide chip 20 is fixed to top surface 11a of first submount 11 by using an adhesive such as an electrically conductive adhesive (not shown). Second optical waveguide chip 30 is placed on second submount 12. Second optical waveguide chip 30 is fixed to top surface 12a of second submount 12 by using an adhesive such as an electrically conductive adhesive (not shown).

First optical waveguide chip 20 includes a first substrate 21, a first optical waveguide 22 and a first waveguide grating 25. First optical waveguide chip 20 includes a first chip bottom surface 20b, a first chip top surface 20a opposite to first chip bottom surface 20b, and a first chip end surface 20c connected to first chip top surface 20a and first chip bottom surface 20b. First chip bottom surface 20b faces main surface 10a of mount 10.

First substrate 21 is made of, for example, a compound semiconductor material such as InP or GaAs. First substrate 21 includes a first substrate bottom surface 21b, a first substrate top surface 21a opposite to first substrate bottom surface 21b, and a substrate end surface 21c connected to first substrate top surface 21a and first substrate bottom surface 21b. First substrate bottom surface 21b faces top surface 11a of first submount 11. First chip top surface 20a is proximal to first substrate top surface 21a and distal from first substrate bottom surface 21b. First chip bottom surface 20b is proximal to first substrate bottom surface 21b and distal from first substrate top surface 21a. First chip bottom surface 20b being proximal to first substrate bottom surface 21b also includes first chip bottom surface 20b being first substrate bottom surface 21b. In the present embodiment, first chip bottom surface 20b is first substrate bottom surface 21b. First chip end surface 20c includes substrate end surface 21c. Substrate end surface 21c is a part of first chip end surface 20c.

First optical waveguide 22 is formed on first substrate top surface 21a. First optical waveguide 22 includes, for example, a core layer 23 and an upper clad layer 24. Core layer 23 is formed on first substrate top surface 21a. Core layer 23 is made of, for example, an InGaAsP-based or AlGaInAs-based compound semiconductor material. When a wavelength of light traveling through core layer 23 is 1.55 µm, core layer 23 has a band gap of, for example, equal to or more than 1.20 µm and equal to 1.40 µm. Upper clad layer 24 is formed on core layer 23. Upper clad layer 24 is made of, for example, a compound semiconductor material such as InP or GaAs. First optical waveguide 22 may further include an upper clad layer 27 described below. Upper clad layer 27 is formed on upper clad layer 24.

First waveguide grating 25 is formed on first substrate top surface 21a. First waveguide grating 25 includes, for example, core layer 23, a first grating 26 and upper clad layer 27. First grating 26 is formed in, for example, core layer 23. Upper clad layer 27 is formed on core layer 23 and first grating 26. Upper clad layer 27 is proximal to first chip top surface 20a relative to core layer 23. In the present embodiment, a surface of upper clad layer 27 opposite to core layer 23 is a part of first chip top surface 20a. Upper clad layer 27 is, for example, a dielectric film such as a silicon oxide film or a silicon nitride film.

First waveguide grating 25 is connected to first optical waveguide 22 and is more proximal to first chip end surface 20c than first optical waveguide 22. For example, light is incident on first optical waveguide 22, and then, is incident on first waveguide grating 25. The light is diffracted toward the first substrate 21 side in first waveguide grating 25 (first grating 26). The light is refracted when exiting from first optical waveguide chip 20, and travels toward a second waveguide grating 35.

Figure 3:
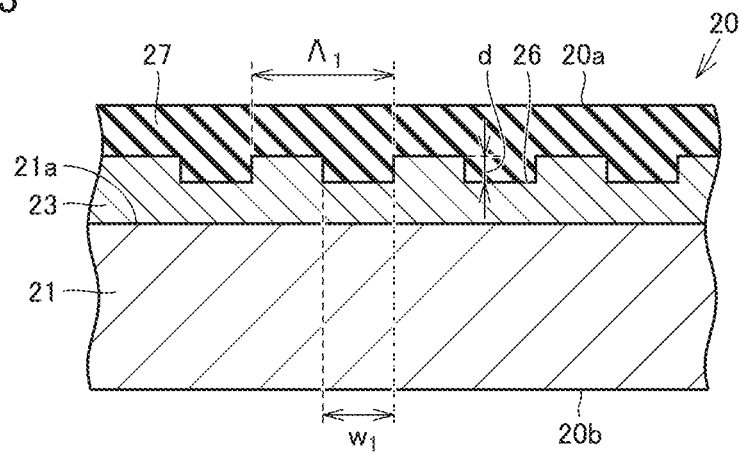
FIG. 3 is a schematic partially enlarged cross-sectional view of a first waveguide grating in the grating coupler according to the first embodiment.

Referring to FIG. 3, first waveguide grating 25 has a first grating pitch $\Lambda_1$ and a first grating width $w_1$. First grating width $w_1$ refers to a width of a recessed portion of first grating 26 in a longitudinal direction of core layer 23. In order to diffract the light incident on first optical waveguide 22 toward the first substrate 21 side, first grating pitch $\Lambda_1$ of first waveguide grating 25 (first grating 26) is three times or more as large as the wavelength of the light. That is, first grating 26 is a long-cycle grating.

First grating pitch $\Lambda_1$ of first waveguide grating 25 may decrease with increasing distance from first optical waveguide 22. First grating pitch $\Lambda_1$ decreases by, for example, 0.1 µm per one pitch of first grating 26 with increasing distance from first optical waveguide 22. Therefore, the light diffracted by first waveguide grating 25 may be converged in a longitudinal direction of a core layer 33 in second waveguide grating 35.

First grating width $w_1$ is 0.4 times or more and 0.6 times or less as large as first grating pitch $\Lambda_1$. When first grating pitch $\Lambda_1$ decreases with increasing distance from first optical waveguide 22, first grating width $w_1$ is 0.4 times or more and 0.6 times or less as large as an average value of first grating pitch $\Lambda_1$. Therefore, the diffraction efficiency of the first-order diffracted light in first waveguide grating 25 (first grating 26) increases and the diffraction efficiency of the high-order diffracted light in first waveguide grating 25 (first grating 26) decreases.

First waveguide grating 25 has a grating depth d. Grating depth d refers to a depth of the recessed portion of first grating 26 in a thickness direction of first waveguide grating 25. Grating depth d is, for example, equal to or more than 100 nm and equal to or less than 250 nm. By increasing grating depth d, the diffraction efficiency in first waveguide grating 25 (first grating 26) increases.

Figure 8:
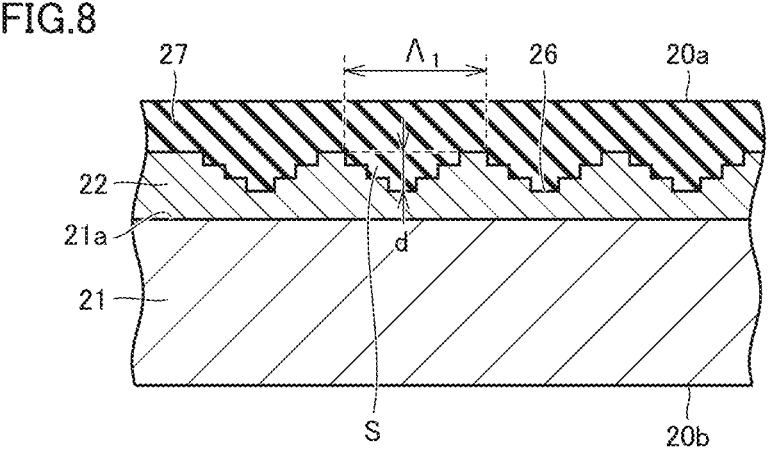
FIG. 8 is a schematic partially enlarged cross-sectional view of a first waveguide grating in a grating coupler according to a first modification of the first embodiment.
Figure 9:
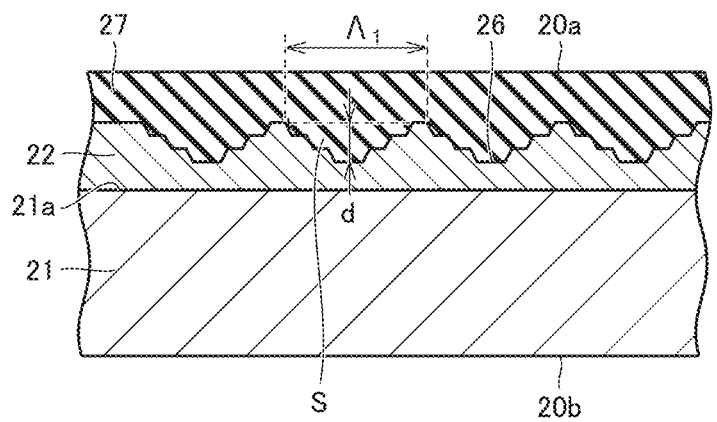
FIG. 9 is a schematic partially enlarged cross-sectional view of a first waveguide grating in a grating coupler according to a second modification of the first embodiment.

As shown in FIGS. 8 and 9, first waveguide grating 25 may be a stepped grating including a plurality of steps. Therefore, the diffraction efficiency of the high-order diffracted light in first waveguide grating 25 decreases and the diffraction efficiency of the first-order diffracted light in first waveguide grating 25 increases. As shown in FIG. 9, the plurality of steps may be inclined steps and first waveguide grating 25 may be a stepped grating including a plurality of inclined steps. Therefore, the diffraction efficiency of the high-order diffracted light in first waveguide grating 25 further decreases and the diffraction efficiency of the first-order diffracted light in first waveguide grating 25 further increases.

In the stepped grating shown in FIGS. 8 and 9, first grating width $w_1$ is given by S/d. Here, S represents a cross-sectional area of a recessed portion in one pitch of the stepped grating. d represents a depth of the recessed portion in one pitch of the stepped grating, which corresponds to a grating depth of the stepped grating.

Figure 2:
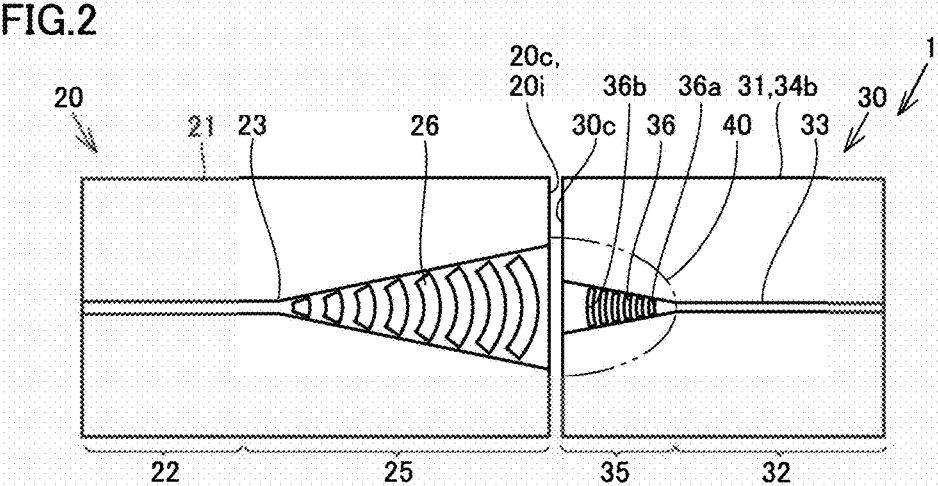
FIG. 2 is a schematic plan view of the grating coupler according to the first embodiment.

Referring to FIG. 2, first waveguide grating 25 (first grating 26) may have an elliptical arc shape that bulges toward first chip end surface 20c in a plan view of first chip top surface 20a. Therefore, the light diffracted by first waveguide grating 25 may be converged in a width direction of core layer 33 in second waveguide grating 35. In addition, first waveguide grating 25 can receive, with higher optical coupling efficiency, the light converged by second waveguide grating 35.

In a plan view of first chip top surface 20a, a width of core layer 23 of first waveguide grating 25 may gradually increase from first optical waveguide 22 toward first chip end surface 20c. Core layer 23 of first waveguide grating 25 may be a tapered waveguide having a width that gradually increases from first optical waveguide 22 toward first chip end surface 20c.

Referring to FIG. 1, second optical waveguide chip 30 includes a second substrate 31, a second optical waveguide 32 and second waveguide grating 35. Second optical waveguide chip 30 includes a second chip bottom surface 30b, a second chip top surface 30a opposite to second chip bottom surface 30b, and a second chip end surface 30c connected to second chip top surface 30a and second chip bottom surface 30b.

Second chip bottom surface 30b faces main surface 10a of mount 10. Second chip bottom surface 30b is more proximal to main surface 10a of mount 10 than first chip bottom surface 20b. Second chip bottom surface 30b faces in the same direction (downward direction in FIG. 1) as that of first chip bottom surface 20b. Second chip top surface 30a is located on the first substrate 21 side relative to first chip top surface 20a in a direction in which first chip top surface 20a and first chip bottom surface 20b are spaced apart from each other. Second chip top surface 30a is more proximal to main surface 10a of mount 10 than first chip top surface 20a in the direction in which first chip top surface 20a and first chip bottom surface 20b are spaced apart from each other. Second chip top surface 30a faces in the same direction (upward direction in FIG. 1) as that of first chip top surface 20a.

Second substrate 31 may be made of a material different from that of first substrate 21. Second substrate 31 is made of, for example, a semiconductor material such as Si. Second substrate 31 includes a second substrate bottom surface 31b and a second substrate top surface 31a opposite to second substrate bottom surface 31b. Second substrate bottom surface 31b faces top surface 12a of second submount 12. Second chip top surface 30a is proximal to second substrate top surface 31a and distal from second substrate bottom surface 31b. Second chip bottom surface 30b is proximal to second substrate bottom surface 31b and distal from second substrate top surface 31a. Second chip bottom surface 30b being proximal to second substrate bottom surface 31b also includes second chip bottom surface 30b being second substrate bottom surface 31b. In the present embodiment, second chip bottom surface is second substrate bottom surface 31b. Second chip end surface 30c is proximal to first chip end surface 20c relative to a second grating 36 of second waveguide grating 35 in a direction of a normal line 20n (see FIGS. 5 and 6) of first chip end surface 20c. Second chip end surface 30c may face first chip end surface 20c (substrate end surface 21c).

Second optical waveguide 32 is formed on second substrate top surface 31a. Second optical waveguide 32 includes, for example, core layer 33, a lower clad layer 34a and an upper clad layer 34b. Lower clad layer 34a is formed on second substrate top surface 31a. Lower clad layer 34a is proximal to second chip bottom surface 30b relative to core layer 33. Lower clad layer 34a is made of, for example, a dielectric material such as silicon oxide. Core layer 33 is formed on lower clad layer 34a. Core layer 33 is made of, for example, a material different from that of core layer 23. Core layer 33 is made of, for example, a semiconductor material such as Si. Upper clad layer 34b is formed on core layer 33. Upper clad layer 34b is proximal to second chip top surface 30a relative to core layer 33. Upper clad layer 34b is made of, for example, a dielectric material such as silicon oxide. In the present embodiment, a surface of upper clad layer 34b opposite to core layer 33 is a part of second chip top surface 30a.

Second waveguide grating 35 is formed on second substrate top surface 31a. Second waveguide grating 35 includes, for example, core layer 33, second grating 36, lower clad layer 34a, and upper clad layer 34b. Second grating 36 is formed in, for example, core layer 33. Upper clad layer 34b is formed on core layer 33 and first grating 26. Second grating 36 may be formed in a portion of upper clad layer 34b that is in contact with core layer 33.

Second waveguide grating 35 is connected to second optical waveguide 32 and is more proximal to first chip end surface 20c than second optical waveguide 32. Second waveguide grating 35 is more proximal to second chip end surface 30c than second optical waveguide 32. Second waveguide grating 35 is arranged on the first substrate 21 side relative to first waveguide grating 25 in the direction in which first chip top surface 20a and first chip bottom surface 20b are spaced apart from each other. Second waveguide grating 35 is more proximal to main surface 10a of mount 10 than first waveguide grating 25 in the direction in which first chip top surface 20a and first chip bottom surface 20b are spaced apart from each other.

Second waveguide grating 35 includes a grating end 36a proximal to second optical waveguide 32, and a grating end 36b opposite to grating end 36a. Grating end 36b is proximal to first chip end surface 20c (or second chip end surface 30c) in the longitudinal direction of core layer 33.

Figure 4:
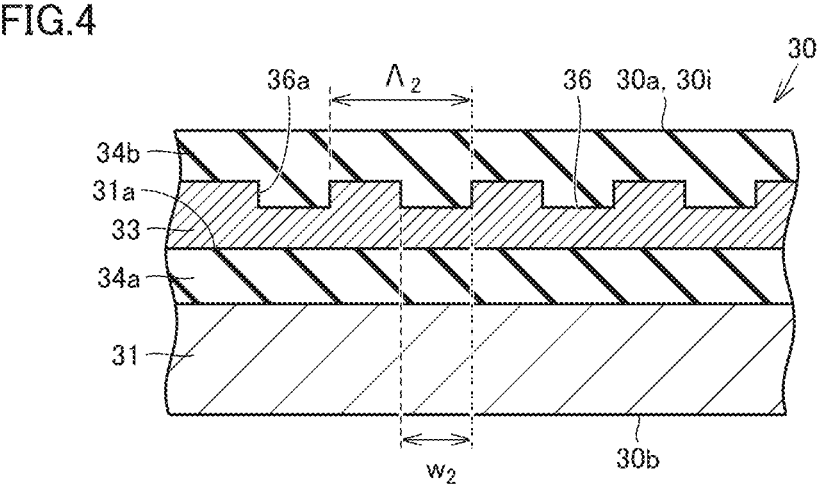
FIG. 4 is a schematic partially enlarged cross-sectional view of a second waveguide grating in the grating coupler according to the first embodiment.

Referring to FIG. 4, second waveguide grating 35 has a second grating pitch $\Lambda_2$ and a second grating width $w_2$. Second grating width $w_2$ refers to a width of a recessed portion of second grating 36 in the longitudinal direction of core layer 33.

Second grating width $w_2$ of a region 36r (see FIG. 7) of second waveguide grating 35 proximal to grating end 36a may be more than 0% and equal to or less than 30% of second grating pitch $\Lambda_2$, or may be more than 70% and less than 100% of second grating pitch $\Lambda_2$. Region 36r of second waveguide grating 35 proximal to grating end 36a refers to a region between grating end 36a and a grating center 36c (see FIG. 7) of second waveguide grating 35 between grating end 36a and grating end 36b. Therefore, a distribution of the diffracted light intensity of second waveguide grating 35 with respect to the position of second waveguide grating 35 can be made smooth. The light can be diffracted over a wider region of second waveguide grating 35 with relatively high diffraction efficiency.

Core layer 33 may be made of, for example, silicon nitride. A refractive index of silicon nitride is smaller than a refractive index of Si. Therefore, the distribution of the diffracted light intensity of second waveguide grating 35 with respect to the position of second waveguide grating 35 can be made smooth. The light can be diffracted over a wider region of second waveguide grating 35 with relatively high diffraction efficiency. Grating coupler 1 has a wider acceptable alignment error.

Referring to FIG. 2, second waveguide grating 35 (second grating 36) may have an elliptical arc shape that bulges toward first chip end surface 20c in a plan view of second chip top surface 30a (or a plan view of first chip top surface 20a). Therefore, second waveguide grating 35 can receive, with higher optical coupling efficiency, the light converged by first waveguide grating 25. In addition, the light diffracted by second waveguide grating 35 may be converged in a width direction of core layer 23 in first waveguide grating 25.

A width of core layer 33 of second waveguide grating 35 may gradually increase from second optical waveguide 32 toward first chip end surface 20c in a plan view of second chip top surface 30a (or a plan view of first chip top surface 20a). Core layer 33 of second waveguide grating 35 may be a tapered waveguide having a width that gradually increases from second optical waveguide 32 toward first chip end surface 20c.

Transparent member 40 is provided on a first light incident/exit surface 20i and on a second light incident/exit surface 30i. Transparent member 40 is transparent over a below-described operating wavelength range of grating coupler 1. Transparent member 40 is made of, for example, a thermosetting resin or an ultraviolet curable resin. Transparent member 40 is, for example, a transparent resin member made of a transparent resin such as a fluorine-containing epoxy-based resin, an acrylic resin, or a bromine-containing epoxy-based resin. A refractive index of transparent member 40 is greater than a refractive index of air. For example, the refractive index of transparent member 40 may be equal to or more than 1.37, may be equal to or more than 1.40, or may be equal to or more than 1.45. For example, the refractive index of transparent member 40 may be equal to or less than 1.70, may be equal to or less than 1.65, or may be equal to or less than 1.60.

A difference between the refractive index of transparent member 40 and a refractive index of a top portion (in the present embodiment, upper clad layer 34b) of second optical waveguide chip 30 including second light incident/exit surface 30i may be equal to or less than 0.20. Therefore, reflection of the light on second light incident/exit surface 30i can be reduced. The difference between the refractive index of transparent member 40 and the refractive index of upper clad layer 34b may be equal to or less than 0.15, may be equal to or less than 0.10, or may be equal to or less than 0.05.

First light incident/exit surface 20i refers to a light exit surface for the light diffracted in first waveguide grating 25 and traveling toward second waveguide grating 35, or a light incident surface for the light diffracted in second waveguide grating 35 and traveling toward first waveguide grating 25. In the present embodiment, first light incident/exit surface 20i is first chip end surface 20c. Second light incident/exit surface 30i refers to a light exit surface for the light diffracted in second waveguide grating 35 and traveling toward first waveguide grating 25, or a light incident surface for the light diffracted in first waveguide grating 25 and traveling toward second waveguide grating 35. In the present embodiment, second light incident/exit surface 30i is second chip top surface 30a.

The light incident on grating coupler 1 passes through first light incident/exit surface 20i of first optical waveguide chip 20 and second light incident/exit surface 30i of second optical waveguide chip 30, and is coupled between first waveguide grating 25 and second waveguide grating 35. First light incident/exit surface 20i extends along first chip end surface 20c. Second light incident/exit surface 30i extends along second chip top surface 30a.

Specifically, the light incident on first optical waveguide 22 is diffracted toward the first substrate 21 side in first waveguide grating 25 (first grating 26), and is incident on second waveguide grating 35. The light is diffracted in second waveguide grating 35 (second grating 36) and coupled to core layer 33. The light is incident on second optical waveguide 32 from second waveguide grating 35 and exits from second optical waveguide 32 to the outside of grating coupler 1. The light diffracted by first waveguide grating 25 and traveling toward second waveguide grating 35 is coupled to, for example, region 36r (see FIG. 7) of second waveguide grating 35 proximal to grating end 36a.

The light incident on second optical waveguide 32 is diffracted in second waveguide grating 35 (second grating 36) and is incident on first waveguide grating 25. The light is diffracted in first waveguide grating 25 (first grating 26) and coupled to core layer 23. The light is incident on first optical waveguide 22 from first waveguide grating 25 and exits from first optical waveguide 22 to the outside of grating coupler 1.

The light incident on grating coupler 1 (first optical waveguide chip 20 or second optical waveguide chip 30) has any wavelength within a wavelength range where grating coupler 1 is used (hereinafter, referred to as "operating wavelength range of grating coupler 1" or simply "operating wavelength range"). When the light incident on grating coupler 1 is, for example, laser light emitted from a fixed wavelength laser, the operating wavelength range of grating coupler 1 is a fixed wavelength of the fixed wavelength laser. When the light incident on grating coupler 1 is laser light emitted from a variable wavelength laser, the operating wavelength range of grating coupler 1 is a variable wavelength range of the variable wavelength laser. The operating wavelength range of grating coupler 1 is, for example, a C band (wavelength band of equal to or more than 1.530 μm and equal to or less than 1.565 μm) or an O band (wavelength band of equal to or more than 1.260 µm and equal to 1.360 µm). A diffraction angle (in a traveling direction) of the light diffracted in first waveguide grating 25 or second waveguide grating 35 varies depending on a difference in wavelength of the light.

An optical path of the light within the operating wavelength range of grating coupler 1 is filled with transparent member 40 between first light incident/exit surface 20i and second light incident/exit surface 30i. The light within the operating wavelength range of grating coupler 1 travels only through transparent member 40 between first light incident/exit surface 20i and second light incident/exit surface 30i. That is, an optical path of the light having a minimum wavelength $\lambda_1$ within the operating wavelength range, an optical path of the light having a center wavelength $\lambda_2$ within the operating wavelength range, and an optical path of the light having a maximum wavelength $\lambda_3$ within the operating wavelength range are filled with transparent member 40 between first light incident/exit surface 20i and second light incident/exit surface 30i. The light having minimum wavelength $\lambda_1$ within the operating wavelength range, the light having center wavelength $\lambda_2$ within the operating wavelength range, and the light having maximum wavelength $\lambda_3$ within the operating wavelength range travel only through transparent member 40 between first light incident/exit surface 20i and second light incident/exit surface 30i.

An exit angle $\theta_2$ (see FIG. 5) at which the light exits from first light incident/exit surface 20i of first optical waveguide chip 20 is, for example, equal to or more than 33°. In the present embodiment, first light incident/exit surface 20i is first chip end surface 20c (substrate end surface 21c). Exit angle $\theta_2$ is defined as an angle between a traveling direction of the light exiting from first light incident/exit surface 20i and normal line 20n (see FIG. 5) of first light incident/exit surface 20i. Therefore, an excessive reduction in optical coupling efficiency between first waveguide grating 25 and second waveguide grating 35 can be prevented. By setting a diffraction angle $\theta_1$ (see FIG. 5) in first waveguide grating 25 to be equal to or more than 15°, for example, exit angle $\theta_2$ can be set to be equal to or more than 33°. Exit angle $\theta_2$ may be adjusted by, for example, first grating pitch $\Lambda_1$ of first waveguide grating 25.

Exit angle $\theta_2$ (see FIG. 5) is, for example, equal to or less than 60°. Therefore, an excessive increase in light reflectance on first light incident/exit surface 20i can be prevented. By setting diffraction angle $\theta_1$ (see FIG. 5) of first waveguide grating 25 to be equal to or less than 25°, for example, exit angle $\theta_2$ can be set to be equal to or less than 60°. By setting first grating pitch $\Lambda_1$ of first waveguide grating 25 to be 2.7 times or more and 5.4 times or less as large as the wavelength of the light (or the center wavelength within the operating wavelength range of grating coupler 1), for example, exit angle $\theta_2$ can be set to be equal to or more than 33° and equal to or less than 60°.

One example of a method for manufacturing grating coupler 1 according to the present embodiment will be described.

The method for manufacturing grating coupler 1 includes producing first optical waveguide chip 20. Specifically, core layer 23 and upper clad layer 24 are formed on first substrate 21 by using a metalorganic chemical vapor deposition (MOCVD) method or the like. A part of upper clad layer 24 and a part of core layer 23 are etched, thereby forming first grating 26. Upper clad layer 27 is formed on core layer 23, first grating 26 and upper clad layer 24 by using a chemical vapor deposition (CVD) method. First optical waveguide chip 20 is thus obtained.

The method for manufacturing grating coupler 1 includes producing second optical waveguide chip 30. Specifically, a silicon on insulator (SOI) substrate is prepared. The SOI substrate includes second substrate 31 (silicon substrate), lower clad layer 34a (silicon oxide layer), and a silicon layer provided on lower clad layer 34a. A part of the silicon layer is etched, thereby forming core layer 33. A part of core layer 33 is etched, thereby forming second grating 36. Upper clad layer 34b is formed on core layer 33, second grating 36 and lower clad layer 34a by using the chemical vapor deposition (CVD) method. Second optical waveguide chip 30 is thus obtained.

Then, first optical waveguide chip 20 is fixed onto first submount 11 (top surface 11a). Second optical waveguide chip 30 is fixed onto second submount 12 (top surface 12a). First submount 11 and second submount 12 are fixed onto main surface 10a of mount 10. Transparent member 40 is formed on first light incident/exit surface 20i and on second light incident/exit surface 30i. Grating coupler 1 is thus obtained.

A function of grating coupler 1 according to the present embodiment will be described by comparing grating coupler 1 according to an example that is one example of grating coupler 1 according to the present embodiment with a grating coupler according to a comparative example.

Figure 5:
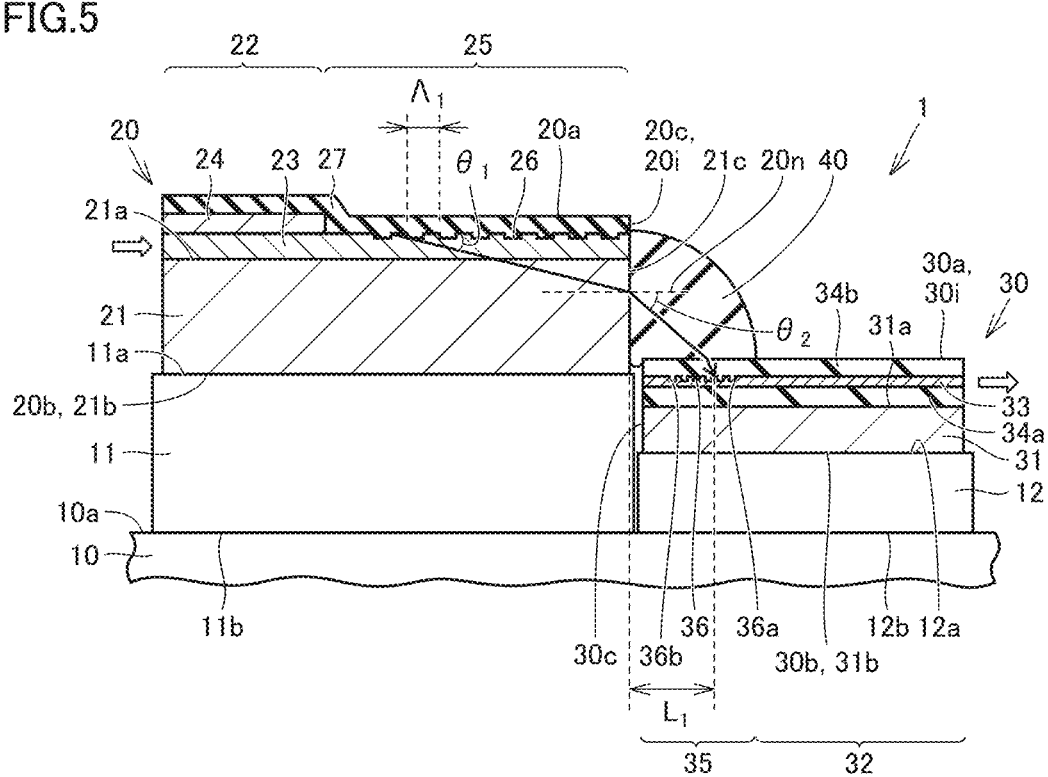
FIG. 5 is a schematic cross-sectional view of the grating coupler according to the first embodiment.

A variation in incident position $L_1$ of the light on second waveguide grating 35 between the light having minimum wavelength $\lambda_1$ within the operating wavelength range of grating coupler 1 and the light having maximum wavelength $\lambda_3$ within the operating wavelength range when the light is coupled from first waveguide grating 25 to second waveguide grating 35 in grating coupler 1 according to the example will be discussed with reference to FIG. 5. Incident position $L_1$ of the light is defined as a distance from first light incident/exit surface 20i to an incident position of the light on second chip top surface 30a of second waveguide grating 35 in the direction of normal line 20n of first light incident/exit surface 20i.

The light is incident on core layer 23 of first optical waveguide 22 and is diffracted by first waveguide grating 25. Diffraction angle $\theta_1$ in first waveguide grating 25 (first grating 26) is given by the following equation (1):

[Equation 1]

$$\theta_1 = \cos^{-1}\left(\frac{n_{wg1} - m\frac{\lambda}{\Lambda_1}}{n_1}\right). \quad (1)$$

$n_{wg1}$ represents a refractive index of core layer 23. $n_1$ represents a refractive index of first substrate 21. $\Lambda_1$ represents a first grating pitch of first waveguide grating 25. $\lambda$ represents a wavelength of the light. m represents a diffraction order. First-order (m=1) diffracted light is coupled between first waveguide grating 25 and second waveguide grating 35.

The light diffracted by first waveguide grating 25 is refracted when exiting from first optical waveguide chip 20. Exit angle $\theta_2$ at which the light diffracted by first waveguide grating 25 exits from first light incident/exit surface 20i (first chip end surface 20c, substrate end surface 21c) is given by the following equation (2):

[Equation 2]

$$\theta_2 = \sin^{-1}\left(\frac{n_1}{n_2}\sin\theta_1\right). \quad (2)$$

$n_2$ represents a refractive index of transparent member 40.

In the present example, first optical waveguide chip 20 is an InGaAsP-based optical waveguide chip. Specifically, first substrate 21 is an InP substrate and $n_1$ is 3.16. Core layer 23 is made of InGaAsP and $n_{wg1}$ is 3.238. First grating pitch $\Lambda_1$ of first waveguide grating 25 is 5.39 μm. The light incident on core layer 23 has any wavelength within the operating wavelength range of equal to or more than 1.53 μm and equal to 1.57 μm. The light having minimum wavelength $\lambda_1$ within the operating wavelength range has a wavelength of 1.53 μm. The light having center wavelength $\lambda_2$ within the operating wavelength range has a wavelength of 1.55 μm. The light having maximum wavelength $\lambda_3$ within the operating wavelength range has a wavelength of 1.57 μm.

Transparent member 40 is made of an epoxy resin and $n_2$ is 1.50. Second optical waveguide chip 30 is a Si-based optical waveguide chip. Specifically, second substrate 31 is a silicon substrate. Lower clad layer 34a is a silicon oxide layer. Core layer 33 is a silicon layer. Upper clad layer 34b is a silicon oxide layer.

As shown in Table 1, in the example, diffraction angle $\theta_1$ and exit angle $\theta_2$ of the light having center wavelength $\lambda_2$ (1.55 μm) within the operating wavelength range are 21.00° and 49.00°, respectively. Table 1 shows diffraction angle $\theta_1$, exit angle $\theta_2$ and incident position $L_1$ of each of the light having minimum wavelength $\lambda_1$ (1.53 μm) within the operating wavelength range and the light having maximum wavelength $\lambda_3$ (1.57 μm) within the operating wavelength range in the example.

TABLE 1

| wavelength (μm) | $\theta_1$ (°) | $\theta_2$ (°) | $L_1$ (μm) |
|---|---|---|---|
| 1.53 | 20.76 | 48.31 | 36.26 |
| 1.55 | 21.00 | 49.00 | |
| 1.57 | 21.17 | 49.53 | 33.83 |

In the example, incident position $L_1$ changes by 2.43 μm (=36.26 μm−33.83 μm) between the light having minimum wavelength $\lambda_1$ within the operating wavelength range and the light having maximum wavelength $\lambda_3$ within the operating wavelength range.

Although the grating coupler according to the comparative example has a structure similar to that of grating coupler 1 according to the example, the grating coupler according to the comparative example is different from grating coupler 1 according to the example in the following point. The grating coupler according to the comparative example does not include transparent member 40. In the comparative example, first chip end surface 20c (substrate end surface 21c) and second chip top surface 30a are exposed to air and $n_2$ (refer to the equation (2) above) is 1.00.

As shown in Table 2, exit angle $\theta_2$ in the comparative example is made equal to exit angle $\theta_2$ in the example. Therefore, in the comparative example, first grating pitch $\Lambda_1$ of first waveguide grating 25 is set at 9.15 μm. In the comparative example, diffraction angle $\theta_1$ of the light having center wavelength $\lambda_2$ (1.55 μm) within the operating wavelength range is 13.80°. Table 2 shows diffraction angle $\theta_1$, exit angle $\theta_2$ and incident position $L_1$ of each of the light having minimum wavelength $\lambda_1$ (1.53 μm) within the operating wavelength range and the light having maximum wavelength $\lambda_3$ (1.57 μm) within the operating wavelength range in the comparative example.

TABLE 2

| wavelength (μm) | $\theta_1$ (°) | $\theta_2$ (°) | $L_1$ (μm) |
|---|---|---|---|
| 1.53 | 13.65 | 48.56 | 37.04 |
| 1.55 | 13.80 | 49.00 | |
| 1.57 | 13.98 | 49.79 | 34.03 |

In the comparative example, incident position $L_1$ changes by 3.01 μm (=37.04 μm−34.033 μm) between the light having minimum wavelength $\lambda_1$ within the operating wavelength range and the light having maximum wavelength $\lambda_3$ within the operating wavelength range.

Therefore, when the light is coupled from first waveguide grating 25 to second waveguide grating 35, transparent member 40 can reduce a variation in incident position $L_1$ of the light on second waveguide grating 35.

Figure 6:
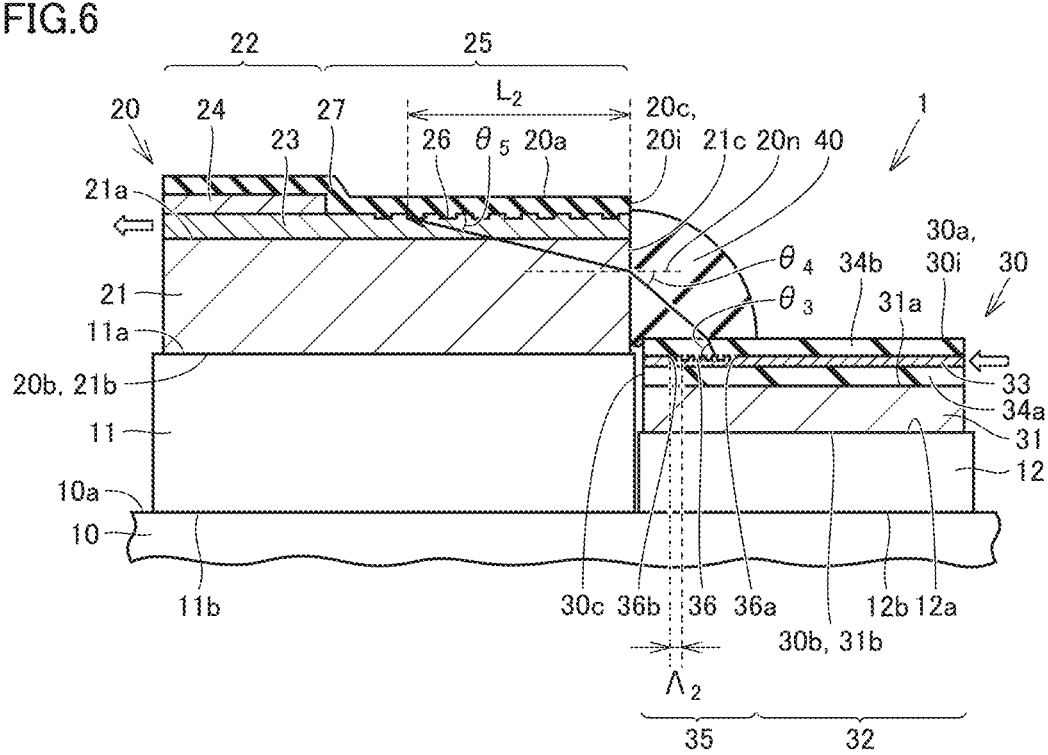
FIG. 6 is a schematic cross-sectional view of the grating coupler according to the first embodiment.

A variation in incident position $L_2$ of the light on first waveguide grating 25 between the light having minimum wavelength $\lambda_1$ within the operating wavelength range and the light having maximum wavelength $\lambda_3$ within the operating wavelength range when the light is coupled from second waveguide grating 35 to first waveguide grating 25 in grating coupler 1 according to the example will be discussed with reference to FIG. 6. Incident position $L_2$ of the light is defined as a distance from first light incident/exit surface 20i to an incident position of the light on first grating 26 of first waveguide grating 25 in the direction of normal line 20n of first light incident/exit surface 20i.

The light is incident on core layer 33 of second optical waveguide 32 and is diffracted by second waveguide grating 35. A diffraction angle $\theta_3$ in second waveguide grating 35 (second grating 36) is given by the following equation (3):

[Equation 3]

$$\theta_3 = \cos^{-1}\left(\frac{n_{wg2} - m\frac{\lambda}{\Lambda_2}}{n_3}\right). \quad (3)$$

$n_{wg2}$ represents a refractive index of core layer 33. $n_3$ represents a refractive index of upper clad layer 34b. $\Lambda_2$ represents a second grating pitch of second waveguide grating 35. λ represents a wavelength of the light. m represents a diffraction order. First-order (m=1) diffracted light is coupled between first waveguide grating 25 and second waveguide grating 35.

The light diffracted by second waveguide grating 35 is refracted on second light incident/exit surface 30i (second chip top surface 30a or an interface between upper clad layer 34b and transparent member 40). In addition, in the present example, second light incident/exit surface 30i is perpendicular to first light incident/exit surface 20i (first chip end surface 20c, substrate end surface 21c). Therefore, an incident angle $\theta_4$ of the light on first light incident/exit surface 20i (first chip end surface 20c, substrate end surface 21c) is given by the following equation (4):

[Equation 4]

$$\theta_4 = 90° - \sin^{-1}\left(\frac{n_3}{n_2} \sin(90° - \theta_3)\right). \quad (4)$$

$n_3$ represents a refractive index of upper clad layer 34b. $n_2$ represents a refractive index of transparent member 40 as described above.

The light refracted on second light incident/exit surface 30i (second chip top surface 30a or the interface between upper clad layer 34b and transparent member 40) is refracted on first light incident/exit surface 20i (first chip end surface 20c, substrate end surface 21c). Therefore, an incident angle $\theta_5$ of the light on core layer 23 is given by the following equation (5):

[Equation 5]

$$\theta_5 = \sin^{-1}\left(\frac{n_2}{n_1} \sin \theta_4\right). \quad (5)$$

$n_1$ represents a refractive index of first substrate 21 as described above.

In the present example, second optical waveguide chip 30 is a Si-based optical waveguide chip. Core layer 33 is a silicon layer and $n_{wg2}$ is 2.797. Upper clad layer 34b is a silicon oxide layer and $n_3$ is 1.50. Referring to Table 1 and Table 3, incident angle $\theta_4$ in the example is made equal to incident angle $\theta_2$ in the example. Therefore, second grating pitch $\Lambda_2$ of second waveguide grating 35 is set at 0.855 µm. Transparent member 40 is made of an epoxy resin and $n_2$ is 1.50. First substrate 21 is an InP substrate and $n_1$ is 3.16.

As shown in Table 3, in the example, incident angle $\theta_4$ and incident angle $\theta_5$ of the light having center wavelength $\lambda_2$ (1.55 µm) within the operating wavelength range are 49.00° and 21.00°, respectively. Table 3 shows incident angle $\theta_4$, incident angle $\theta_5$ and incident position $L_2$ of each of the light having minimum wavelength $\lambda_1$ (1.53 µm) within the operating wavelength range and the light having maximum wavelength $\lambda_3$ (1.57 µm) within the operating wavelength range in the example.

TABLE 3

| wavelength (µm) | $\theta_4$ (°) | $\theta_5$ (°) | $L_2$ (µm) |
| --- | --- | --- | --- |
| 1.53 | 47.80 | 20.59 | 140.92 |
| 1.55 | 49.00 | 21.00 | |
| 1.57 | 50.17 | 21.38 | 126.98 |

In the example, incident position $L_2$ changes by 13.94 µm (=140.92 µm−126.98 µm) between the light having minimum wavelength $\lambda_1$ within the operating wavelength range and the light having maximum wavelength $\lambda_3$ within the operating wavelength range.

Although the grating coupler according to the comparative example has a structure similar to that of grating coupler 1 according to the example, the grating coupler according to the comparative example is different from grating coupler 1 according to the example in the following point. The grating coupler according to the comparative example does not include transparent member 40. In the comparative example, first chip end surface 20c (substrate end surface 21c) and second chip top surface 30a are exposed to air and $n_2$ (refer to the equations (4) and (5) above) is 1.00.

As shown in Table 4, incident angle $\theta_4$ in the comparative example is made equal to incident angle $\theta_4$ in the example. Therefore, in the comparative example, second grating pitch $\Lambda_2$ of second waveguide grating 35 is set at 0.720 µm. In the comparative example, diffraction angle $\theta_1$ of the light having center wavelength $\lambda_2$ (1.55 µm) within the operating wavelength range is 13.80°. Table 4 shows incident angle $\theta_4$, incident angle $\theta_5$ and incident position $L_2$ of each of the light having minimum wavelength $\lambda_1$ (1.53 µm) within the operating wavelength range and the light having maximum wavelength $\lambda_3$ (1.57 µm) within the operating wavelength range in the comparative example.

TABLE 4

| wavelength (µm) | $\theta_4$ (°) | $\theta_5$ (°) | $L_2$ (µm) |
| --- | --- | --- | --- |
| 1.53 | 47.77 | 13.55 | 219.83 |
| 1.55 | 49.00 | 13.80 | |
| 1.57 | 51.93 | 14.43 | 183.04 |

In the comparative example, incident position $L_2$ changes by 36.79 µm (=219.83 µm−183.04 µm) between the light having minimum wavelength $\lambda_1$ within the operating wavelength range and the light having maximum wavelength $\lambda_3$ within the operating wavelength range.

Therefore, when the light is coupled from second waveguide grating 35 to first waveguide grating 25, transparent member 40 can reduce a variation in incident position $L_2$ of the light on first waveguide grating 25.

In this way, transparent member 40 can reduce a variation in incident position $L_1$ of the light on second waveguide grating 35 and a variation in incident position $L_2$ of the light on first waveguide grating 25. Similarly, transparent member 40 can also reduce a variation in incident position (incident position $L_1$, incident position $L_2$) of the light with respect to a change in relative position between first optical waveguide chip 20 and second optical waveguide chip 30.

A reason why the acceptable alignment error between first optical waveguide chip 20 and second optical waveguide chip 30 is widened in grating coupler 1 is as follows.

Figure 7:
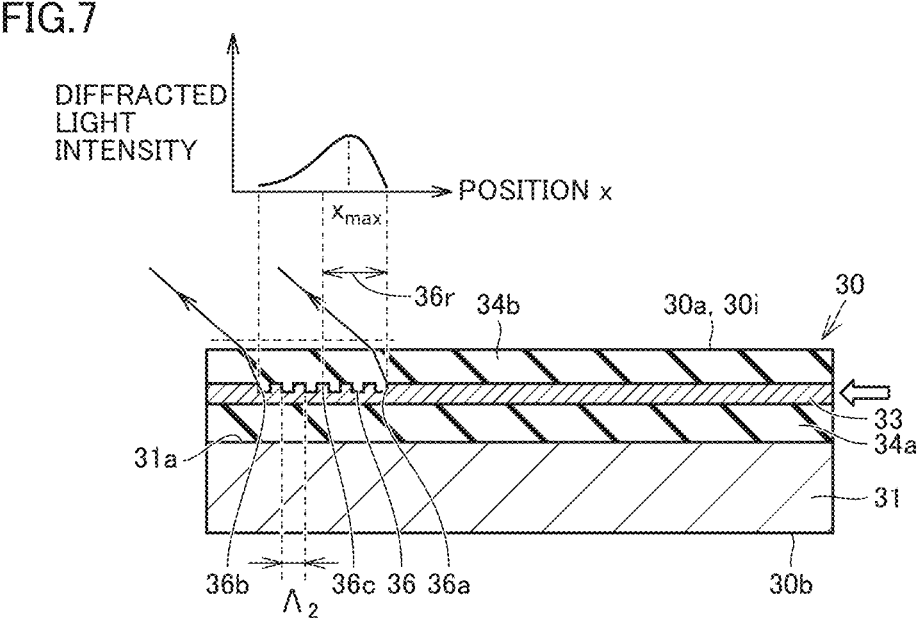
FIG. 7 is a schematic partially enlarged cross-sectional view of a second optical waveguide chip in the grating coupler according to the first embodiment.

Referring to FIG. 7, second waveguide grating 35 diffracts the light that is incident from second optical waveguide 32. The distribution of the diffracted light intensity of second waveguide grating 35 with respect to a position x of second waveguide grating 35 is nonuniform. The diffracted light intensity of second waveguide grating 35 changes depending on position x where the light is diffracted by second waveguide grating 35. Specifically, the diffracted light intensity of second waveguide grating 35 is maximized at a position between grating end 36a and grating center 36c (region 36r of second grating 36 proximal to grating end 36a). The diffracted light intensity of second waveguide grating 35 decreases monotonically with increasing distance from a maximum diffraction position $x_{max}$ where the diffracted light intensity of second waveguide grating 35 is maximized. In contrast, the distribution of the diffracted light intensity of second waveguide grating 35 hardly changes depending on the wavelength of the light.

Generally, a grating has a reversible property about the traveling direction of the light. Therefore, a distribution of the optical coupling efficiency of second waveguide grating 35 with respect to the light incident on second waveguide grating 35 is also nonuniform. The optical coupling efficiency of second waveguide grating 35 changes depending on incident position $L_1$ (see FIG. 5) of the light on second waveguide grating 35. Specifically, the optical coupling efficiency of second waveguide grating 35 is maximized at a position between grating end 36a and grating center 36c (region 36r of second grating 36 proximal to grating end 36a). The optical coupling efficiency of second waveguide grating 35 decreases monotonically with increasing distance from maximum diffraction position $x_{max}$. In contrast, the distribution of the optical coupling efficiency of second waveguide grating 35 hardly changes depending on the wavelength of the light.

Therefore, when the relative position between first optical waveguide chip 20 and second optical waveguide chip 30 changes, incident position $L_1$ (see FIG. 5) of the light from first waveguide grating 25 to second waveguide grating 35 changes and the optical coupling efficiency of second waveguide grating 35 with respect to the light changes. As described above, transparent member 40 reduces the change in incident position $L_1$ (see FIG. 5) of the light on second waveguide grating 35 and reduces the change in optical coupling efficiency of second waveguide grating 35 with respect to the light.

Similarly, when the relative position between first optical waveguide chip 20 and second optical waveguide chip 30 changes, incident position $L_2$ (see FIG. 6) of the light from second waveguide grating 35 to first waveguide grating 25 changes and the optical coupling efficiency of first waveguide grating 25 with respect to the light changes. Transparent member 40 reduces the change in incident position $L_2$ (see FIG. 6) of the light on first waveguide grating 25 and reduces the change in optical coupling efficiency of first waveguide grating 25 with respect to the light.

In this way, transparent member 40 allows grating coupler 1 to have a wider acceptable alignment error. In addition, transparent member 40 can expand the wavelength range of the light coupled between first waveguide grating 25 and second waveguide grating 35 with acceptable minimum optical coupling efficiency.

Figure 10:
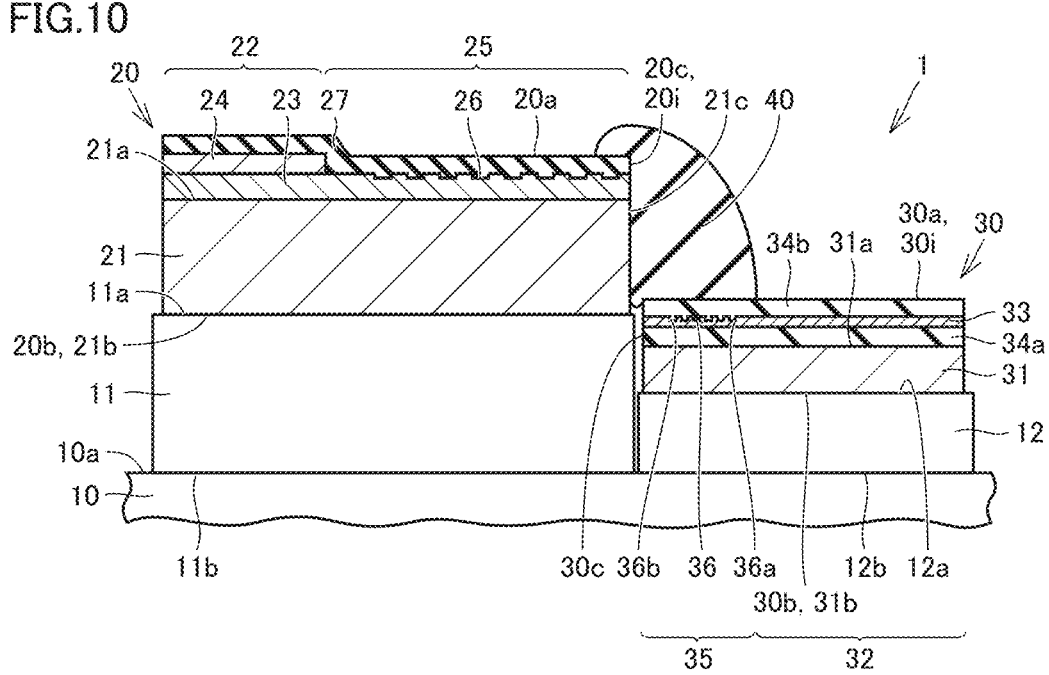
FIG. 10 is a schematic cross-sectional view of a grating coupler according to a third modification of the first embodiment.

Referring to FIG. 10, in grating coupler 1 according to a modification of the present embodiment, transparent member 40 may be further provided on first chip top surface 20a.

An effect of grating coupler 1 according to the present embodiment will be described.

Grating coupler 1 according to the present embodiment includes first optical waveguide chip 20, second optical waveguide chip 30 and transparent member 40. First optical waveguide chip 20 includes first substrate 21 including first substrate top surface 21a, first optical waveguide 22, first waveguide grating 25, first chip bottom surface 20b, first chip top surface 20a opposite to first chip bottom surface 20b, and first chip end surface 20c connected to first chip top surface 20a and first chip bottom surface 20b. First optical waveguide 22 is formed on first substrate top surface 21a. First waveguide grating 25 is formed on first substrate top surface 21a. First waveguide grating 25 is connected to first optical waveguide 22 and is more proximal to first chip end surface 20c than first optical waveguide 22.

Second optical waveguide chip 30 includes second substrate 31 including second substrate top surface 31a, second optical waveguide 32, second waveguide grating 35, and second chip top surface 30a. Second optical waveguide 32 is formed on second substrate top surface 31a. Second waveguide grating 35 is formed on second substrate top surface 31a. Second waveguide grating 35 is connected to second optical waveguide 32 and is more proximal to first chip end surface 20c than second optical waveguide 32. Second waveguide grating 35 is arranged on the first substrate 21 side relative to first waveguide grating 25 in the direction in which first chip top surface 20a and first chip bottom surface 20b are spaced apart from each other. The light incident on grating coupler 1 passes through first light incident/exit surface 20i of first optical waveguide chip 20 and second light incident/exit surface 30i of second optical waveguide chip 30, and is coupled between first waveguide grating 25 and second waveguide grating 35, first light incident/exit surface 20i extending along first chip end surface 20c, second light incident/exit surface 30i extending along second chip top surface 30a. The optical path of the light within the operating wavelength range of grating coupler 1 is filled with transparent member 40 between first light incident/exit surface 20i and second light incident/exit surface 30i.

Transparent member 40 reduces a variation in incident position (incident position $L_1$, incident position $L_2$) of the light on first waveguide grating 25 or second waveguide grating 35 with respect to a change in relative position between first optical waveguide chip 20 and second optical waveguide chip 30. A change in optical coupling efficiency of first waveguide grating 25 with respect to the light or a change in optical coupling efficiency of second waveguide grating 35 with respect to the light can be reduced. Therefore, grating coupler 1 has a wider acceptable alignment error. In addition, grating coupler 1 can expand the wavelength range of the light coupled between first waveguide grating 25 and second waveguide grating 35 with acceptable minimum optical coupling efficiency.

In grating coupler 1 according to the present embodiment, exit angle $\theta_2$ at which the light diffracted by first waveguide grating 25 and traveling toward second waveguide grating 35 exits from first light incident/exit surface 20i (first chip end surface 20c, substrate end surface 21c) of first optical waveguide chip 20 is equal to or more than 33° and equal to or less than 60°.

Therefore, a reduction in optical coupling efficiency between first waveguide grating 25 and second waveguide grating 35 can be prevented and an excessive increase in light reflectance on first light incident/exit surface 20i can be prevented. The optical coupling efficiency between first waveguide grating 25 and second waveguide grating 35 can be increased. Grating coupler 1 has a wider acceptable alignment error. In addition, grating coupler 1 can expand the wavelength range of the light coupled between first waveguide grating 25 and second waveguide grating 35 with acceptable minimum optical coupling efficiency.

In grating coupler 1 according to the present embodiment, transparent member 40 is made of a thermosetting resin or an ultraviolet curable resin.

Therefore, grating coupler 1 has a wider acceptable alignment error. In addition, grating coupler 1 can expand the wavelength range of the light coupled between first waveguide grating 25 and second waveguide grating 35 with acceptable minimum optical coupling efficiency.

In grating coupler 1 according to the present embodiment, second waveguide grating 35 includes a first grating end (grating end 36a) proximal to second optical waveguide 32, and a second grating end (grating end 36b) proximal to first chip end surface 20c. The light diffracted by first waveguide grating 25 and traveling toward second waveguide grating 35 is coupled to region 36r of second waveguide grating 35 proximal to the first grating end.

Region 36r proximal to the first grating end (grating end 36a) has relatively high optical coupling efficiency in second waveguide grating 35. Therefore, the optical coupling efficiency between first waveguide grating 25 and second waveguide grating 35 can be increased. Grating coupler 1 has a wider acceptable alignment error. In addition, grating coupler 1 can expand the wavelength range of the light coupled between first waveguide grating 25 and second waveguide grating 35 with acceptable minimum optical coupling efficiency.

In grating coupler 1 according to the present embodiment, second waveguide grating 35 has second grating pitch $\Lambda_2$ and second grating width $w_2$. Second waveguide grating 35 includes a first grating end (grating end 36a) proximal to second optical waveguide 32, and a second grating end (grating end 36b) proximal to first chip end surface 20c. Second grating width $w_2$ of region 36r of second waveguide grating 35 proximal to the first grating end is more than 0% and equal to or less than 30% of second grating pitch $\Lambda_2$, or more than 70% and less than 100% of second grating pitch $\Lambda_2$.

Therefore, the distribution of the diffracted light intensity of second waveguide grating 35 with respect to the position of second waveguide grating 35 can be made smooth. The light can be diffracted over a wider region of second waveguide grating 35 with relatively high diffraction efficiency. Grating coupler 1 has a wider acceptable alignment error. In addition, grating coupler 1 can expand the wavelength range of the light coupled between first waveguide grating 25 and second waveguide grating 35 with acceptable minimum optical coupling efficiency.

In grating coupler 1 according to the present embodiment, first waveguide grating 25 has first grating pitch $\Lambda_1$ and first grating width $w_1$. First grating width $w_1$ is 0.4 times or more and 0.6 times or less as large as first grating pitch $\Lambda_1$.

Therefore, the diffraction efficiency of the first-order diffracted light in first waveguide grating 25 increases and the diffraction efficiency of the high-order diffracted light in first waveguide grating 25 decreases. The optical coupling efficiency between first waveguide grating 25 and second waveguide grating 35 can be increased. Grating coupler 1 has a wider acceptable alignment error. In addition, grating coupler 1 can expand the wavelength range of the light coupled between first waveguide grating 25 and second waveguide grating 35 with acceptable minimum optical coupling efficiency.

In grating coupler 1 according to the present embodiment, first grating pitch $\Lambda_1$ of first waveguide grating 25 decreases with increasing distance from first optical waveguide 22.

Therefore, the light diffracted by first waveguide grating 25 may be converged in second waveguide grating 35. The optical coupling efficiency between first waveguide grating 25 and second waveguide grating 35 can be increased. Grating coupler 1 has a wider acceptable alignment error. In addition, grating coupler 1 can expand the wavelength range of the light coupled between first waveguide grating 25 and second waveguide grating 35 with acceptable minimum optical coupling efficiency.

In grating coupler 1 according to the present embodiment, first waveguide grating 25 is a stepped grating including a plurality of steps.

Therefore, the diffraction efficiency of the high-order diffracted light in first waveguide grating 25 decreases and the diffraction efficiency of the first-order diffracted light in first waveguide grating 25 increases. The optical coupling efficiency between first waveguide grating 25 and second waveguide grating 35 can be increased. Grating coupler 1 has a wider acceptable alignment error. In addition, grating coupler 1 can expand the wavelength range of the light coupled between first waveguide grating 25 and second waveguide grating 35 with acceptable minimum optical coupling efficiency.

In grating coupler 1 according to the present embodiment, the plurality of steps are inclined steps.

Therefore, the diffraction efficiency of the high-order diffracted light in first waveguide grating 25 further decreases and the diffraction efficiency of the first-order diffracted light in first waveguide grating 25 further increases. The optical coupling efficiency between first waveguide grating 25 and second waveguide grating 35 can be further increased. Grating coupler 1 has a wider acceptable alignment error. In addition, grating coupler 1 can expand the wavelength range of the light coupled between first waveguide grating 25 and second waveguide grating 35 with acceptable minimum optical coupling efficiency.

In grating coupler 1 according to the present embodiment, first grating 26 of first waveguide grating 25 has an elliptical arc shape that bulges toward first chip end surface 20c in a plan view of first chip top surface 20a. Second grating 36 of second waveguide grating 35 has an elliptical arc shape that bulges toward first chip end surface 20c in a plan view of second chip top surface 30a.

Therefore, the light diffracted by first waveguide grating 25 may be converged in second waveguide grating 35. Second waveguide grating 35 can receive, with higher optical coupling efficiency, the light converged by first waveguide grating 25. Or the light diffracted by second waveguide grating 35 may be converged in first waveguide grating 25. First waveguide grating 25 can receive, with higher optical coupling efficiency, the light converged by second waveguide grating 35. The optical coupling efficiency between first waveguide grating 25 and second waveguide grating 35 can be increased. Grating coupler 1 has a wider acceptable alignment error. In addition, grating coupler 1 can expand the wavelength range of the light coupled between first waveguide grating 25 and second waveguide grating 35 with acceptable minimum optical coupling efficiency.

In grating coupler 1 according to the present embodiment, first waveguide grating 25 includes a first core layer (core layer 23) made of a compound semiconductor material. Second waveguide grating 35 includes a second core layer (core layer 33) made of silicon.

Therefore, even when first optical waveguide chip 20 and second optical waveguide chip 30 are made of different materials, grating coupler 1 has a wider acceptable alignment error. In addition, even when first optical waveguide chip 20 and second optical waveguide chip 30 are made of different materials, grating coupler 1 can expand the wavelength range of the light coupled between first waveguide grating 25 and second waveguide grating 35 with acceptable minimum optical coupling efficiency.

Grating coupler 1 according to the present embodiment further includes a first mount (first submount 11) on which first optical waveguide chip 20 is placed, and a second mount (second submount 12) on which second optical waveguide chip 30 is placed. A second height (height $h_2$) of the second mount is lower than a first height (height $h_1$) of the first mount.

Therefore, using the first mount (first submount 11) and the second mount (second submount 12), second waveguide grating 35 can be arranged on the first substrate 21 side relative to first waveguide grating 25 in the direction in which first chip top surface 20a and first chip bottom surface 20b are spaced apart from each other.

In grating coupler 1 according to the present embodiment, a difference between a first refractive index of transparent member 40 and a second refractive index of a top portion (e.g., upper clad layer 34b) of second optical waveguide chip 30 including second light incident/exit surface 30i is equal to or less than 0.20.

Therefore, reflection of the light on second light incident/exit surface 30i can be reduced. The optical coupling efficiency between first waveguide grating 25 and second waveguide grating 35 is increased. Grating coupler 1 has a wider acceptable alignment error. In addition, grating coupler 1 can expand the wavelength range of the light coupled between first waveguide grating 25 and second waveguide grating 35 with acceptable minimum optical coupling efficiency.

Second Embodiment

Figure 11:
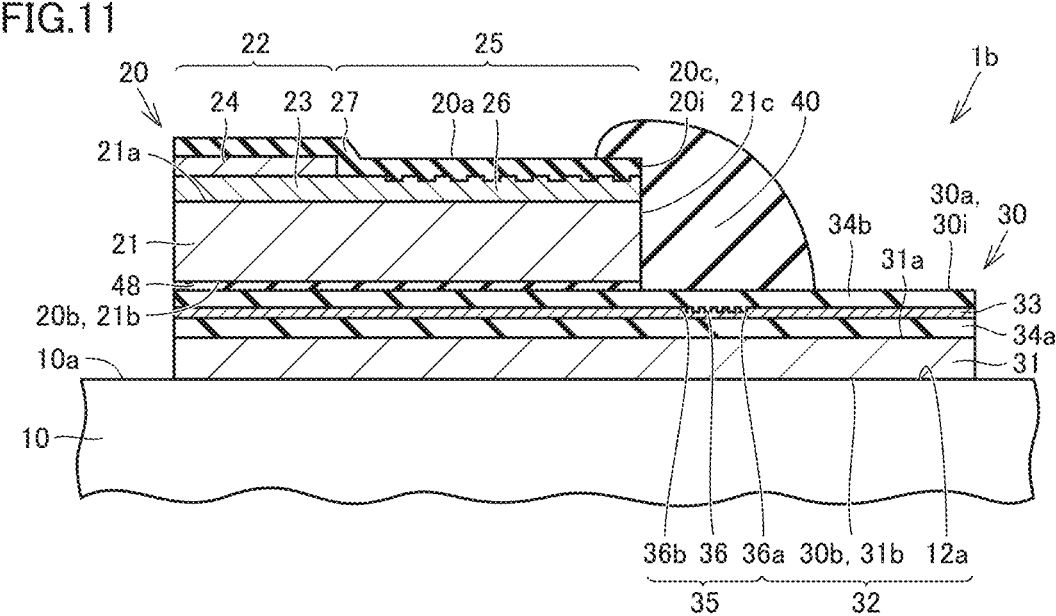
FIG. 11 is a schematic cross-sectional view of a grating coupler according to a second embodiment.

A grating coupler 1b according to a second embodiment will be described with reference to FIG. 11. Although grating coupler 1b according to the present embodiment is configured similarly to grating coupler 1 according to the modification of the first embodiment (see FIG. 10), grating coupler 1b according to the present embodiment is different from grating coupler 1 according to the modification of the first embodiment mainly in the following point.

Grating coupler 1b does not include first submount 11 and second submount 12 (see FIG. 10). The second optical waveguide chip is fixed onto main surface 10a of mount 10. First optical waveguide chip 20 is placed on second chip top surface 30a. Specifically, a joining member 48 such as solder or an adhesive is arranged between first chip bottom surface 20b of first optical waveguide chip 20 and second chip top surface 30a of second optical waveguide chip 30. First optical waveguide chip 20 is fixed onto second chip top surface 30a by using joining member 48.

In addition to the effect of grating coupler 1 according to the first embodiment, grating coupler 1b according to the present embodiment produces the following effect.

In grating coupler 1b according to the present embodiment, first optical waveguide chip 20 is placed on second chip top surface 30a.

Without using first submount 11 and second submount 12 (see FIG. 10), second waveguide grating 35 can be arranged on the first substrate 21 side relative to first waveguide grating 25 in the direction in which first chip top surface 20a and first chip bottom surface 20b are spaced apart from each other. Since first submount 11 and second submount 12 (see FIG. 10) are unnecessary, grating coupler 1b can be reduced in size and cost.

Third Embodiment

Figure 12:
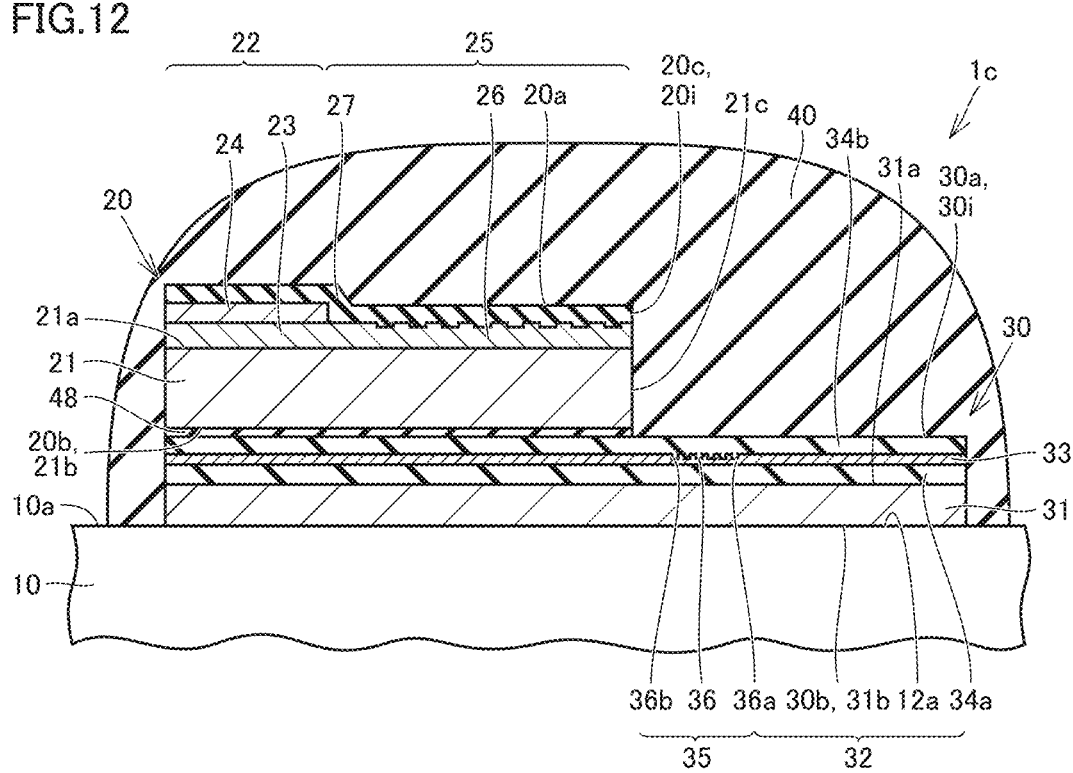
FIG. 12 is a schematic cross-sectional view of a grating coupler according to a third embodiment.

A grating coupler 1c according to a third embodiment will be described with reference to FIG. 12. Although grating coupler 1c according to the present embodiment is configured similarly to grating coupler 1b according to the second embodiment, grating coupler 1c according to the present embodiment is different from grating coupler 1b according to the second embodiment mainly in the following point.

In grating coupler 1c, the whole of first optical waveguide chip 20 and the whole of second optical waveguide chip 30 are covered with transparent member 40. First optical waveguide chip 20 and second optical waveguide chip 30 are sealed by transparent member 40.

In addition to the effect of grating coupler 1b according to the second embodiment, grating coupler 1c according to the present embodiment produces the following effect.

In grating coupler 1c according to the present embodiment, the whole of first optical waveguide chip 20 and the whole of second optical waveguide chip 30 are covered with transparent member 40. Therefore, protection of first optical waveguide chip 20 and second optical waveguide chip 30 from humidity, mechanical shock or the like can be achieved by transparent member 40. The lifetime of grating coupler 1c can be extended.

Fourth Embodiment

Figure 13:
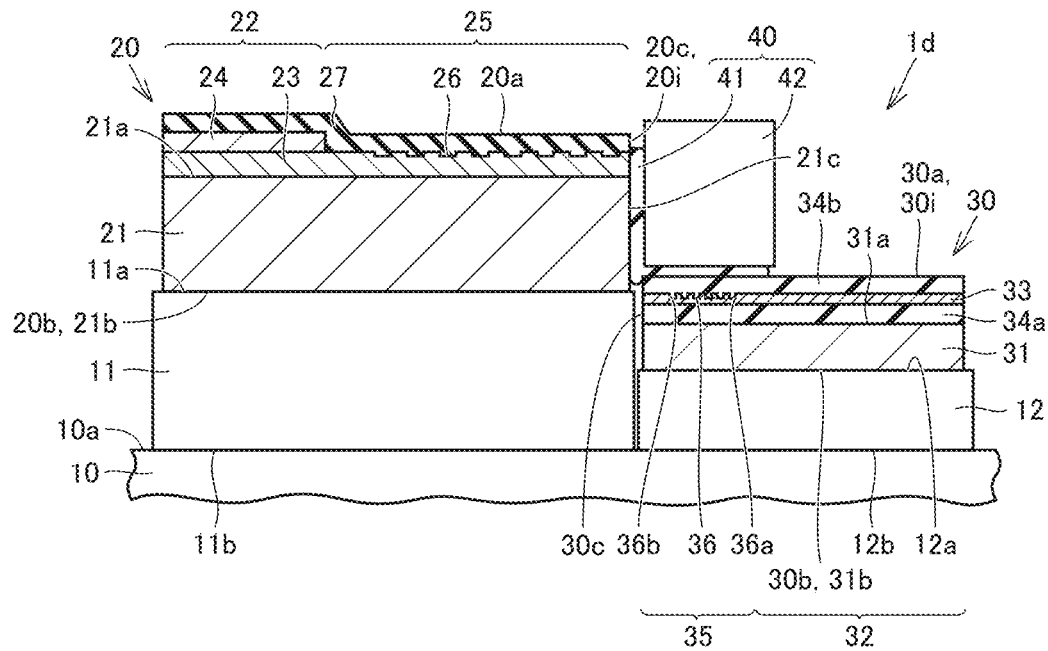
FIG. 13 is a schematic cross-sectional view of a grating coupler according to a fourth embodiment.

A grating coupler 1d according to a fourth embodiment will be described with reference to FIG. 13. Although grating coupler 1d according to the present embodiment is configured similarly to grating coupler 1 according to the first embodiment, grating coupler 1d according to the present embodiment is different from grating coupler 1 according to the first embodiment mainly in the following point.

In grating coupler 1d, transparent member 40 includes a transparent adhesive layer 41 and a transparent block 42. Transparent block 42 is transparent over the operating wavelength range of grating coupler 1d. Transparent block 42 is made of, for example, glass or transparent plastic. Transparent block 42 is bonded to first light incident/exit surface 20i (first chip end surface 20c) and second light incident/exit surface 30i (second chip top surface 30a) by transparent adhesive layer 41. Transparent adhesive layer 41 is transparent over the operating wavelength range of grating coupler 1d. Transparent adhesive layer 41 is made of, for example, a thermosetting resin or a photocurable resin. Transparent adhesive layer 41 is made of, for example, an epoxy-based resin or an acrylic resin.

A difference between a refractive index of transparent adhesive layer 41 and a refractive index of a top portion (in the present embodiment, upper clad layer 34b) of second optical waveguide chip 30 including second light incident/exit surface 30i may be equal to or less than 0.20. Therefore, reflection of the light on second light incident/exit surface 30i can be reduced. The difference between the refractive index of transparent member 40 and the refractive index of upper clad layer 34b may be equal to or less than 0.15, may be equal to or less than 0.10, or may be equal to or less than 0.05.

A difference between the refractive index of transparent adhesive layer 41 and a refractive index of transparent block 42 may be equal to or less than 0.10. Therefore, reflection of the light on an interface between transparent adhesive layer 41 and transparent block 42 can be reduced. The difference between the refractive index of transparent adhesive layer 41 and the refractive index of transparent block 42 may be equal to or less than 0.05. The refractive index of transparent adhesive layer 41 and the refractive index of transparent block 42 may be equal to each other.

In addition to the effect of grating coupler 1 according to the first embodiment, grating coupler 1d according to the present embodiment produces the following effect.

In grating coupler 1d according to the present embodiment, transparent member 40 includes transparent adhesive layer 41 and transparent block 42. Transparent block 42 is bonded to first light incident/exit surface 20i and second light incident/exit surface 30i by transparent adhesive layer 41.

Even when a space between first light incident/exit surface 20i and second light incident/exit surface 30i is large, the space can be easily filled with transparent member 40 including transparent block 42. Grating coupler 1 has a wider acceptable alignment error. In addition, grating coupler 1 can expand the wavelength range of the light coupled between first waveguide grating 25 and second waveguide grating 35 with acceptable minimum optical coupling efficiency.

Fifth Embodiment

Figure 14:
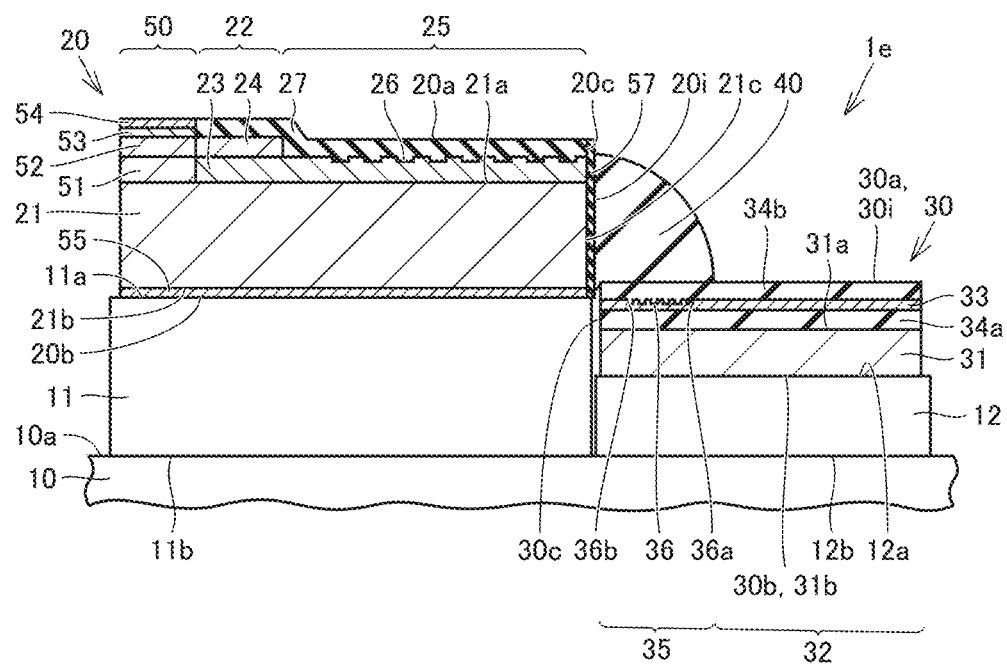
FIG. 14 is a schematic cross-sectional view of a grating coupler according to a fifth embodiment.

A grating coupler 1e according to a fifth embodiment will be described with reference to FIG. 14. Although grating coupler 1e according to the present embodiment is configured similarly to grating coupler 1 according to the first embodiment, grating coupler 1e according to the present embodiment is different from grating coupler 1 according to the first embodiment mainly in the following point.

In grating coupler 1e, first optical waveguide chip 20 further includes a laser structure 50. Laser structure 50 herein refers to a structure that can amplify the light by stimulated emission. Laser structure 50 is, for example, a laser light source or an optical amplifier. Particularly, laser structure 50 is, for example, a semiconductor laser light source or a semiconductor optical amplifier. First optical waveguide 22 is arranged between laser structure 50 and first waveguide grating 25. First optical waveguide 22 couples the light exiting from laser structure 50 to first waveguide grating 25.

Laser structure 50 includes an active region 51 optically coupled to first optical waveguide 22. Active region 51 is made of, for example, an InGaAsP-based or AlGaAs-based compound semiconductor material. Active region 51 may have, for example, a multiple quantum well (MQW) structure. Active region 51 is formed on, for example, first substrate 21 (first substrate top surface 21a). Active region 51 may be directly connected to first optical waveguide 22 by butt joint connection or the like.

Laser structure 50 further includes an upper clad layer 52, a contact layer 53, an upper electrode 54, and a lower electrode 55. First substrate 21 is, for example, an n type InP substrate. Upper clad layer 52 is formed on active region 51. Upper clad layer 52 is, for example, a p-type InP layer. Contact layer 53 is, for example, a p-type InGaAs layer. Upper electrode 54 is formed on contact layer 53. Lower electrode 55 is provided on first substrate bottom surface 21b of first substrate 21. A surface of lower electrode 55 opposite to first substrate bottom surface 21b is first chip bottom surface 20b.

First optical waveguide chip 20 further includes an antireflective film 57 provided on first chip end surface 20c (substrate end surface 21c). Antireflective film 57 reduces reflection of the light on first chip end surface 20c (substrate end surface 21c). Antireflective film 57 may be made of, for example, a material having a refractive index higher than that of transparent member 40, such as silicon nitride or tantalum oxide. Antireflective film 57 may be, for example, a dielectric multilayer film in which low-refractive-index dielectric layers such as silicon oxide and high-refractive-index dielectric layers such as silicon nitride or tantalum oxide are alternately stacked. In the present embodiment, first light incident/exit surface 20i is a surface of antireflective film 57 opposite to first chip end surface 20c.

In a first example of the present embodiment, first optical waveguide chip 20 may be a semiconductor laser light source, second optical waveguide chip 30 may be an optical modulator, and grating coupler 1e may be an optical transmitter. In a second example of the present embodiment, first optical waveguide chip 20 may be a semiconductor optical amplifier (SOA), and second optical waveguide chip 30 may be a part of an external resonator.

In addition to the effect of grating coupler 1 according to the first embodiment, grating coupler 1e according to the present embodiment produces the following effect.

In grating coupler 1e according to the present embodiment, first optical waveguide chip 20 further includes antireflective film 57 provided on first chip end surface 20c.

Therefore, reflection of the light on first light incident/exit surface 20i can be reduced. The optical coupling efficiency between first waveguide grating 25 and second waveguide grating 35 is increased. Grating coupler 1e has a wider acceptable alignment error. In addition, grating coupler 1e can expand the wavelength range of the light coupled between first waveguide grating 25 and second waveguide grating 35 with acceptable minimum optical coupling efficiency.

In grating coupler 1e according to the present embodiment, first optical waveguide chip 20 further includes laser structure 50. First optical waveguide 22 is arranged between laser structure 50 and first waveguide grating 25. Laser structure 50 includes active region 51 optically coupled to first optical waveguide 22.

Laser structure 50 is integrated into first optical waveguide chip 20 of grating coupler 1e. Since it is unnecessary to provide laser structure 50 separately from grating coupler 1e, an optical system including grating coupler 1e and laser structure 50 can be reduced in size. Grating coupler 1e can be used as an optical transmitter or an optical amplifier.

It should be understood that the first to fifth embodiments and the modifications thereof disclosed herein are illustrative and non-restrictive in every respect. At least two of the first to fifth embodiments and the modifications thereof may be combined, unless otherwise contradicted. The scope of the present disclosure is defined by the terms of the claims, rather than the description above, and is intended to include any modifications within the scope and meaning equivalent to the terms of the claims.

REFERENCE SIGNS LIST 1, 1b, 1c, 1d, 1e grating coupler; 10 mount; 10a main surface; 11 first submount; 11a top surface; 11b bottom surface; 12 second submount; 12a top surface; 12b bottom surface; 20 first optical waveguide chip; 20a first chip top surface; 20b first chip bottom surface; 20c first chip end surface; 20i first light incident/exit surface; 20n normal line; 21 first substrate; 21a first substrate top surface; 21b first substrate bottom surface; 21c substrate end surface; 22 first optical waveguide; 23 core layer; 24 upper clad layer; 25 first waveguide grating; 26 first grating; 27 upper clad layer; 30 second optical waveguide chip; 30a second chip top surface; 30b second chip bottom surface; 30c second chip end surface; 30i second light incident/exit surface; 31 second substrate; 31a second substrate top surface; 31b second substrate bottom surface; 32 second optical waveguide; 33 core layer; 34a lower clad layer; 34b upper clad layer; 35 second waveguide grating; 36 second grating; 36a, 36b grating end; 36c grating center; 36r region; 40 transparent member; 41 transparent adhesive layer; 42 transparent block; 48 joining member; 50 laser structure; 51 active region; 52 upper clad layer; 53 contact layer; 54 upper electrode; 55 lower electrode; 57 antireflective film.

The invention claimed is:

1. A grating coupler comprising:
a first optical waveguide chip;
a second optical waveguide chip; and
a transparent member, wherein
the first optical waveguide chip includes a first substrate including a first substrate top surface, a first optical waveguide formed on the first substrate top surface, a first waveguide grating formed on the first substrate top surface, a first chip bottom surface, a first chip top surface opposite to the first chip bottom surface, and a first chip end surface connected to the first chip top surface and the first chip bottom surface,
the first waveguide grating is connected to the first optical waveguide and is more proximal to the first chip end surface than the first optical waveguide,
the second optical waveguide chip includes a second substrate including a second substrate top surface, a second optical waveguide formed on the second substrate top surface, a second waveguide grating formed on the second substrate top surface, and a second chip top surface,
the second waveguide grating is connected to the second optical waveguide and is more proximal to the first chip end surface than the second optical waveguide,
the second waveguide grating is arranged on the first substrate side relative to the first waveguide grating in a direction in which the first chip top surface and the first chip bottom surface are spaced apart from each other,
light incident on the grating coupler passes through a first light incident/exit surface of the first optical waveguide chip and a second light incident/exit surface of the second optical waveguide chip, and is coupled between the first waveguide grating and the second waveguide grating, the first light incident/exit surface extending along the first chip end surface, the second light incident/exit surface extending along the second chip top surface,
between the first light incident/exit surface and the second light incident/exit surface, an optical path of the light within an operating wavelength range of the grating coupler is filled with the transparent member, and
the transparent member is configured to reduce a change in an incidence position of the light incident on the grating coupler within the operating wavelength range of the grating coupler, compared to a case where the transparent member is not present.

2. The grating coupler according to claim 1, wherein an exit angle at which the light diffracted by the first waveguide grating and traveling toward the second waveguide grating exits from the first light incident/exit surface of the first optical waveguide chip is equal to or more than 33° and equal to or less than 60°.

3. The grating coupler according to claim 1, wherein the transparent member is made of a thermosetting resin or an ultraviolet curable resin.

4. The grating coupler according to claim 1, wherein the transparent member includes a transparent adhesive layer and a transparent block, and
the transparent block is bonded to the first light incident/exit surface and the second light incident/exit surface by the transparent adhesive layer.

5. The grating coupler according to claim 1, wherein the whole of the first optical waveguide chip and the whole of the second optical waveguide chip are covered with the transparent member.

6. The grating coupler according to claim 1, wherein the second waveguide grating includes a first grating end proximal to the second optical waveguide, and a second grating end proximal to the first chip end surface, and
the light diffracted by the first waveguide grating and traveling toward the second waveguide grating is coupled to a region of the second waveguide grating proximal to the first grating end.

7. The grating coupler according to claim 1, wherein the second waveguide grating has a second grating pitch and a second grating width,
the second waveguide grating includes a first grating end proximal to the second optical waveguide, and a second grating end proximal to the first chip end surface, and
the second grating width of a region of the second waveguide grating proximal to the first grating end is more than 0% and equal to or less than 30% of the second grating pitch, or more than 70% and less than 100% of the second grating pitch.

8. The grating coupler according to claim 1, wherein the first waveguide grating has a first grating pitch and a first grating width, and
the first grating width is 0.4 times or more and 0.6 times or less as large as the first grating pitch.

9. The grating coupler according to claim 1, wherein a first grating pitch of the first waveguide grating decreases with increasing distance from the first optical waveguide.

10. The grating coupler according to claim 1, wherein the first waveguide grating is a stepped grating including a plurality of steps.

11. The grating coupler according to claim 10, wherein the plurality of steps are inclined steps.

12. The grating coupler according to claim 1, wherein a first grating of the first waveguide grating has an elliptical arc shape that bulges toward the first chip end surface in a plan view of the first chip top surface, and
a second grating of the second waveguide grating has an elliptical arc shape that bulges toward the first chip end surface in a plan view of the second chip top surface.

13. The grating coupler according to claim 1, wherein the first waveguide grating includes a first core layer made of a compound semiconductor material, and
the second waveguide grating includes a second core layer made of silicon.

14. The grating coupler according to claim 1, wherein the first optical waveguide chip further includes an anti-reflective film provided on the first chip end surface.

15. The grating coupler according to claim 1, wherein the first optical waveguide chip further includes a laser structure,
the first optical waveguide is arranged between the laser structure and the first waveguide grating, and
the laser structure includes an active region optically coupled to the first optical waveguide.

16. The grating coupler according to claim 1, further comprising:
a first mount on which the first optical waveguide chip is placed; and
a second mount on which the second optical waveguide chip is placed, wherein
a second height of the second mount is lower than a first height of the first mount.

17. The grating coupler according to claim 1, wherein the first optical waveguide chip is placed on the second chip top surface.

18. The grating coupler according to claim 1, wherein
a difference between a first refractive index of the transparent member and a second refractive index of a top portion of the second optical waveguide chip including the second light incident/exit surface is equal to or less than 0.20.

19. A grating coupler comprising:
a first optical waveguide chip;
a second optical waveguide chip; and
a transparent member, wherein
the first optical waveguide chip includes a first substrate including a first substrate top surface, a first optical waveguide formed on the first substrate top surface, a first waveguide grating formed on the first substrate top surface, a first chip bottom surface, a first chip top surface opposite to the first chip bottom surface, and a first chip end surface connected to the first chip top surface and the first chip bottom surface,
the first waveguide grating is connected to the first optical waveguide and is more proximal to the first chip end surface than the first optical waveguide,
the second optical waveguide chip includes a second substrate including a second substrate top surface, a second optical waveguide formed on the second substrate top surface, a second waveguide grating formed on the second substrate top surface, and a second chip top surface,
the second waveguide grating is connected to the second optical waveguide and is more proximal to the first chip end surface than the second optical waveguide,
the second waveguide grating is arranged on the first substrate side relative to the first waveguide grating in a direction in which the first chip top surface and the first chip bottom surface are spaced apart from each other,
light incident on the grating coupler passes through a first light incident/exit surface of the first optical waveguide chip and a second light incident/exit surface of the second optical waveguide chip, and is coupled between the first waveguide grating and the second waveguide grating, the first light incident/exit surface extending along the first chip end surface, the second light incident/exit surface extending along the second chip top surface,
between the first light incident/exit surface and the second light incident/exit surface, an optical path of the light within an operating wavelength range of the grating coupler is filled with the transparent member,
the second waveguide grating includes a first grating end proximal to the second optical waveguide, and a second grating end proximal to the first chip end surface, and
the light diffracted by the first waveguide grating and traveling toward the second waveguide grating is coupled to a region of the second waveguide grating proximal to the first grating end.

20. A grating coupler comprising:
a first optical waveguide chip;
a second optical waveguide chip; and
a transparent member, wherein
the first optical waveguide chip includes a first substrate including a first substrate top surface, a first optical waveguide formed on the first substrate top surface, a first waveguide grating formed on the first substrate top surface, a first chip bottom surface, a first chip top surface opposite to the first chip bottom surface, and a first chip end surface connected to the first chip top surface and the first chip bottom surface,
the first waveguide grating is connected to the first optical waveguide and is more proximal to the first chip end surface than the first optical waveguide,
the second optical waveguide chip includes a second substrate including a second substrate top surface, a second optical waveguide formed on the second substrate top surface, a second waveguide grating formed on the second substrate top surface, and a second chip top surface,
the second waveguide grating is connected to the second optical waveguide and is more proximal to the first chip end surface than the second optical waveguide,
the second waveguide grating is arranged on the first substrate side relative to the first waveguide grating in a direction in which the first chip top surface and the first chip bottom surface are spaced apart from each other,
light incident on the grating coupler passes through a first light incident/exit surface of the first optical waveguide chip and a second light incident/exit surface of the second optical waveguide chip, and is coupled between the first waveguide grating and the second waveguide grating, the first light incident/exit surface extending along the first chip end surface, the second light incident/exit surface extending along the second chip top surface,
between the first light incident/exit surface and the second light incident/exit surface, an optical path of the light within an operating wavelength range of the grating coupler is filled with the transparent member, and
a difference between a first refractive index of the transparent member and a second refractive index of a top portion of the second optical waveguide chip including the second light incident/exit surface is equal to or less than 0.20.

* * * * *